United States Patent [19]

Su

[11] Patent Number: 5,636,758

[45] Date of Patent: Jun. 10, 1997

[54] REMOTE CONTROL RECEIVER BOX ASSEMBLY

[76] Inventor: Chih-hai Su, No. 88-1, Niu Chuang Li, Shan Hua Chen, Tainan Hsien, Taiwan

[21] Appl. No.: 544,207

[22] Filed: Oct. 17, 1995

[51] Int. Cl.[6] .................................................. B65D 8/18
[52] U.S. Cl. ..................... 220/3.8; 220/3.94; 220/4.33; 220/410; 220/662
[58] Field of Search .................... 220/3.8, 3.2, 3.3, 220/3.94, 4.33, 4.21, 2.1 R, 410, 408, 23.83, 23.86, 662, 663, 664, 665, 675, 674, 671, 669, 327, 693, 906

[56] References Cited

U.S. PATENT DOCUMENTS

| 2,506,003 | 5/1950 | Triplett | 220/3.94 |
| 2,596,236 | 5/1952 | Glosier | 220/3.8 |
| 3,205,764 | 9/1965 | Letter | 220/662 |
| 4,427,705 | 1/1984 | Wyslotsky et al. | 220/4.21 |
| 4,501,359 | 2/1985 | Yoshizawa | 220/662 |
| 4,632,269 | 12/1986 | Rose | 220/3.8 |
| 4,782,945 | 11/1988 | Geiler et al. | 220/410 |
| 5,148,932 | 9/1992 | Orefice | 220/23.83 |
| 5,261,558 | 11/1993 | Claydon | 220/906 |
| 5,515,988 | 5/1996 | Oda | 220/3.8 |

Primary Examiner—Stephen J. Castellano
Attorney, Agent, or Firm—Bacon & Thomas

[57] ABSTRACT

A remote control receiver box assembly includes a body and a casing wherein the body is enclosed by the casing, the body having three concave portions defined in an outer periphery of the body and each of the concave portions being made of transparent material such that a signal receiving element is disposed in the body and is located behind each of the concave portions, the casing having three openings defined in a periphery thereof and when the body is inserted in the casing, each of the concave portions is in alignment with the opening corresponding thereto.

4 Claims, 5 Drawing Sheets

REMOTE CONTROL RECEIVER BOX ASSEMBLY

BACKGROUND OF THE INVENTION

1. Field of Invention

The present invention relates to a box assembly and more particularly, to a remote control receiver box assembly used on a remote control ceiling fan, light, etc. and the box assembly prevents the receiving surface from being scratched and scraped when assembling.

2. Related Prior Art

Referring to FIG. 1 which shows a conventional remote control receiver box assembly, such a box assembly can be used on a ceiling fan and/or a ceiling light and is composed of a body 60 and a casing 64. The body 60 is a cylindrical element and has a recess defined in a top thereof for related electrical elements 61 being received therein. The body 60 has two window portions 63 (only one is shown) formed on an outer periphery thereof and each of the window portions 63 is made of transparent material such that a receiving element 62 can be disposed in the recess of the body 60 and located corresponding to the window portion 63 to receive a signal emitted from a remote controller (not shown) via the window portions 63. The casing 64 is a cylindrical shell which has two holes 65 defined in the shell. When assembling the box assembly, the body 60 is inserted into the casing 64 and in order to achieve a secure engagement between the casing 64 and the body 60, an outer diameter of the body 60 is sized to closely fitted into the casing 64. However, such an insertion often scratches and scrapes the window portions 63 and this is an adverse for the signal receiving process.

Responsive to this, an improved casing 75 is developed and is shown in FIG. 2, the casing 75 has two rectangular openings 77 defined therein and each of two sides of each of the openings 77 has a hole 76 defined therein. Two covers 78 each made of transparent material have two hook elements 781 extending transversely from the same side facing to the casing 75. The body 70 has two rectangular window portions 71 formed in a periphery thereof and each of the two rectangular window portions 71 has a slit 72 defined in two sides of the periphery of the body 70. The body 70 has an outer diameter smaller than that of an inner diameter of the casing 75 such that the body 70 is disposed in the casing 75 and the window portions 77 will not be scratched or scraped. Each one of the hook elements 781 of the cover 78 extends through the corresponding hole 76 and is engaged with the corresponding slit 72 so as to mount the cover 78 onto the opening 77. Nevertheless, to manufacture holes 76 and slits 72 increases manufacturing cost thereof and this is adverse to a commercial purpose.

The present invention intends to provide a box assembly which has a body and a casing in which the body is received, the body has concave window portions defined therein such that when the body is inserted into the casing, the concave window portions will not be scratched or scraped so as to mitigate and/or obviate the above-mentioned problems.

SUMMARY OF THE INVENTION

The present invention provides a remote control receiver box assembly and includes a body and a casing wherein the body is enclosed by the casing, the body having three concave portions defined in an outer periphery of the body and each of the concave portions being made of transparent material such that a signal receiving element is disposed in the body and is located behind each of the concave portions. The casing has three openings defined in a periphery thereof and when the body is inserted in the casing, each of the concave portions is in alignment with the opening corresponding thereto and therefore scratches and scrapes usually caused by the insertion of the body can be effectively avoided.

It is an object of the present invention to provide a box assembly including a body and a casing for the body disposed therein and a remote control receiver is disposed in the body which has three transparent and concave portions for a signal being received by the receiver via the concave portion.

It is another object of the present invention to provide a box assembly which prevents being scratched or scraped on the receiving window when assembling.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
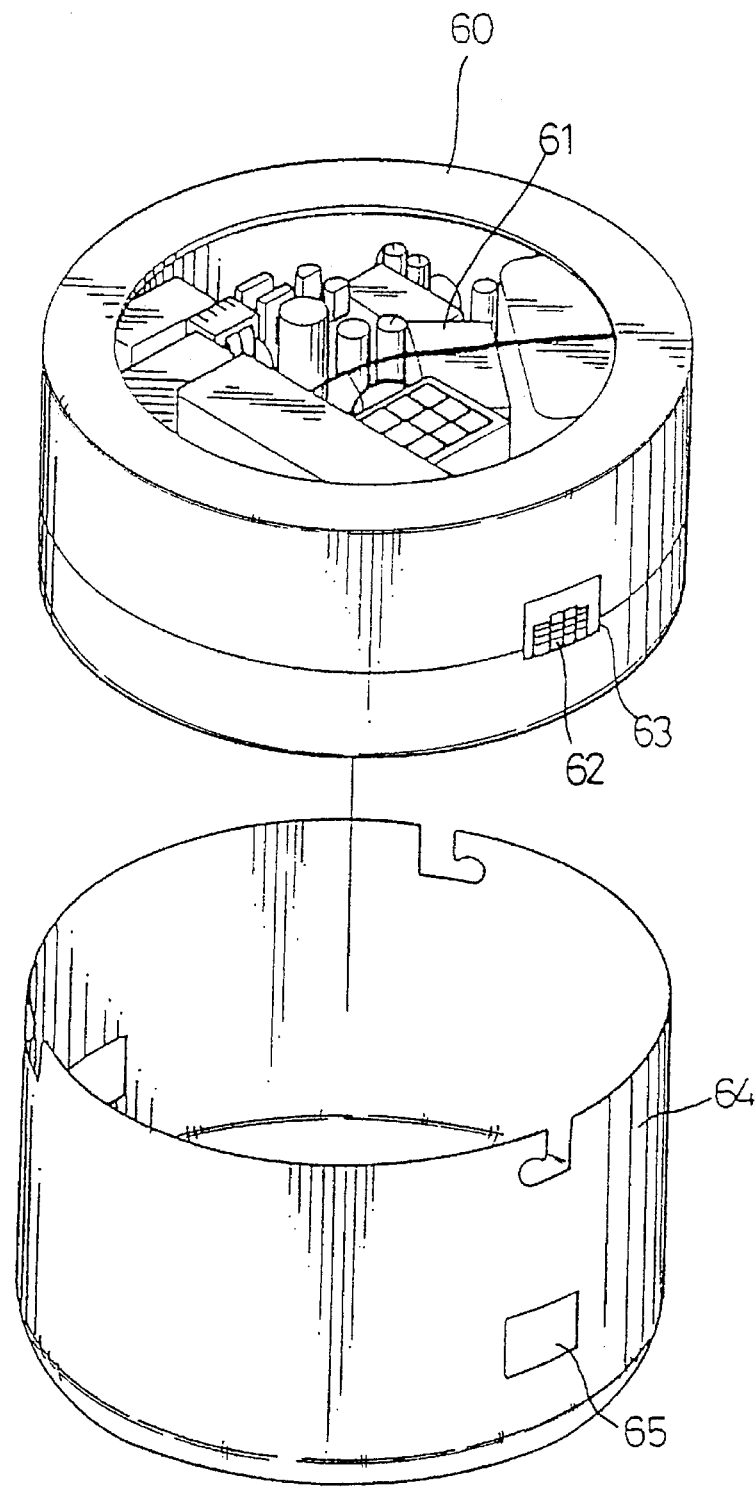
FIG. 1 is an exploded view of a conventional remote control receiver box assembly; in accordance with the present invention.
Figure 2:
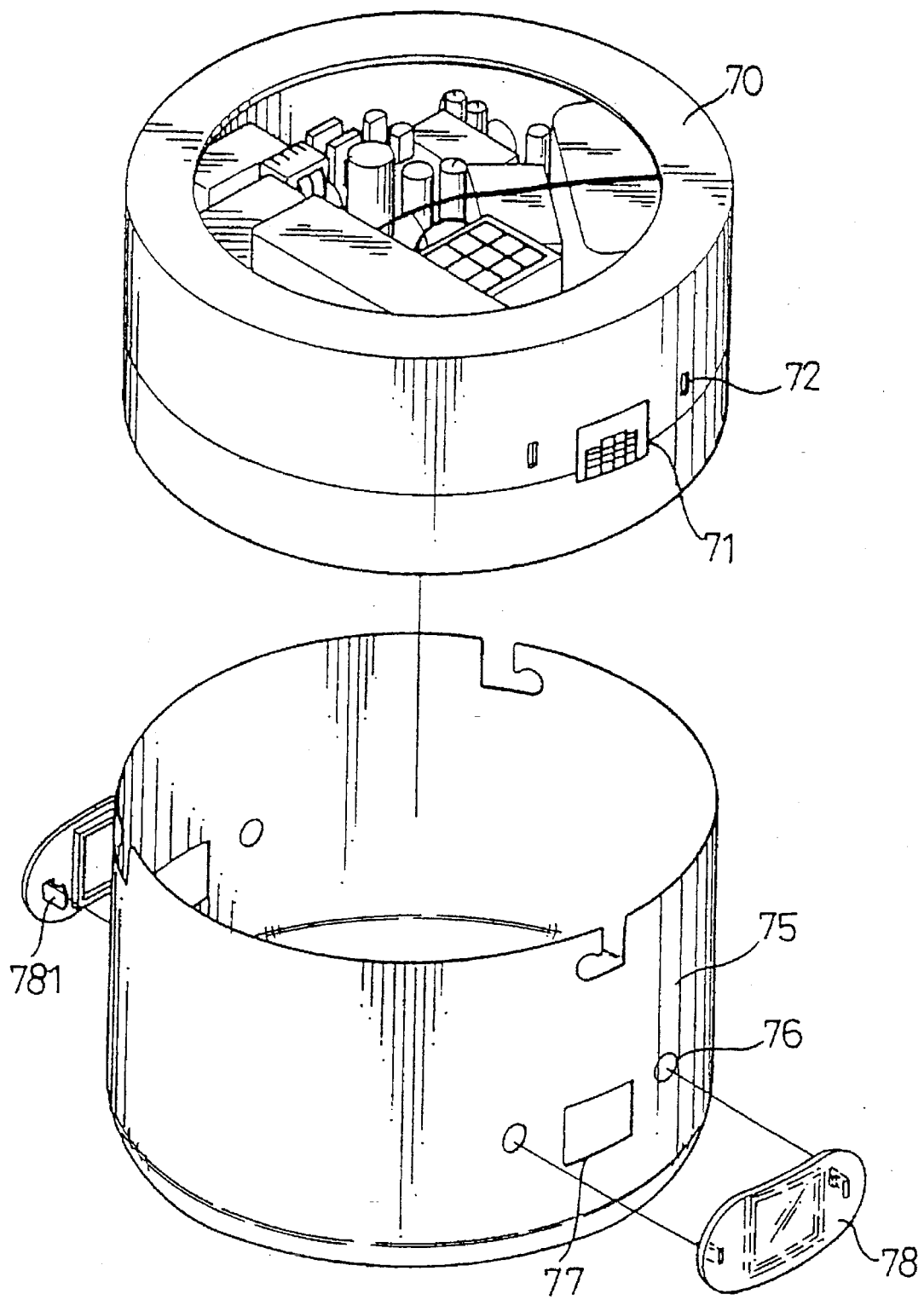
FIG. 2 is an exploded view of another conventional remote control receiver box assembly.
Figure 3:
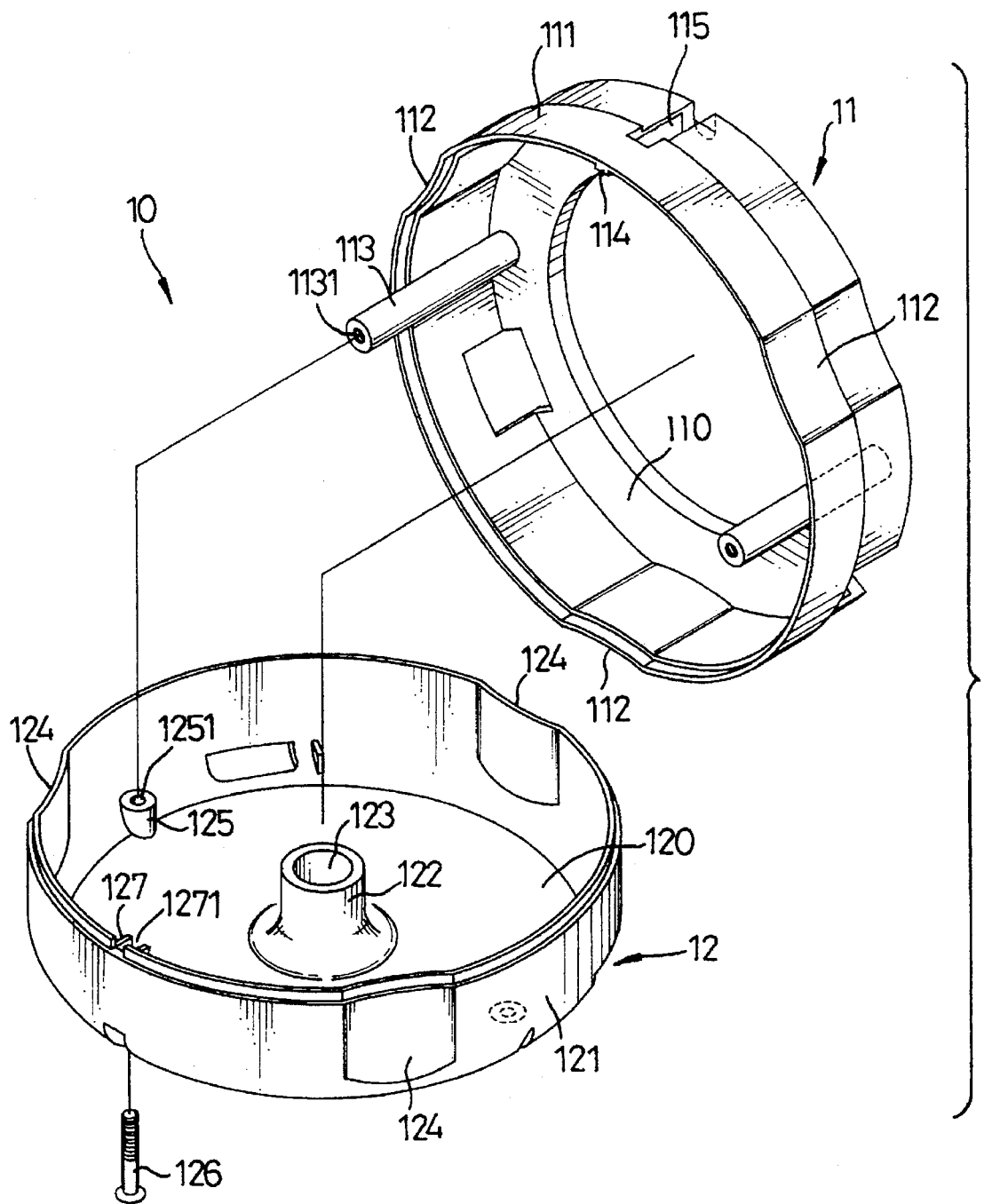
FIG. 3 is an exploded view of a body in accordance with the present invention.
Figure 4:
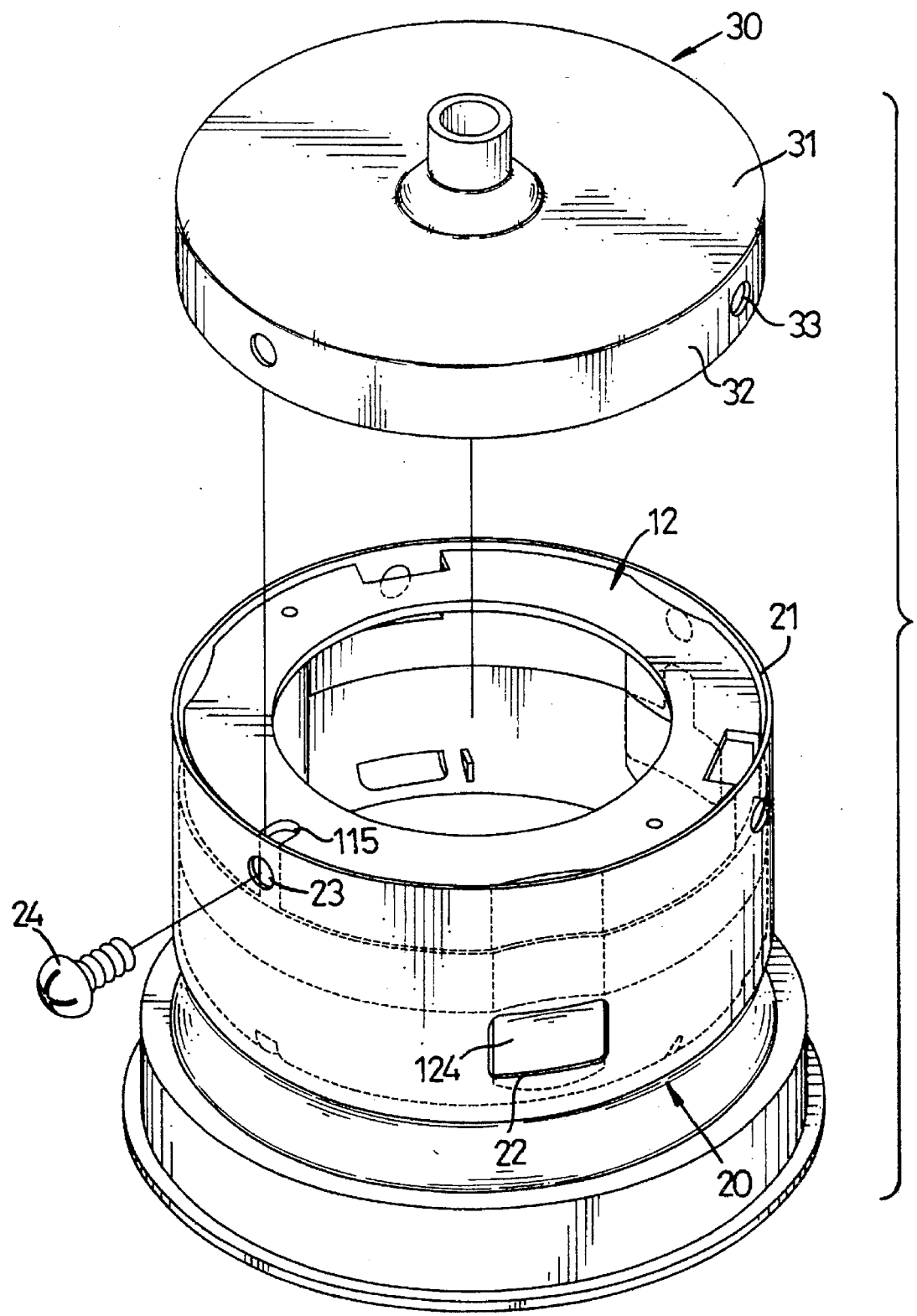
FIG. 4 is an exploded view of the body received in a casing and a lid.
Figure 5:
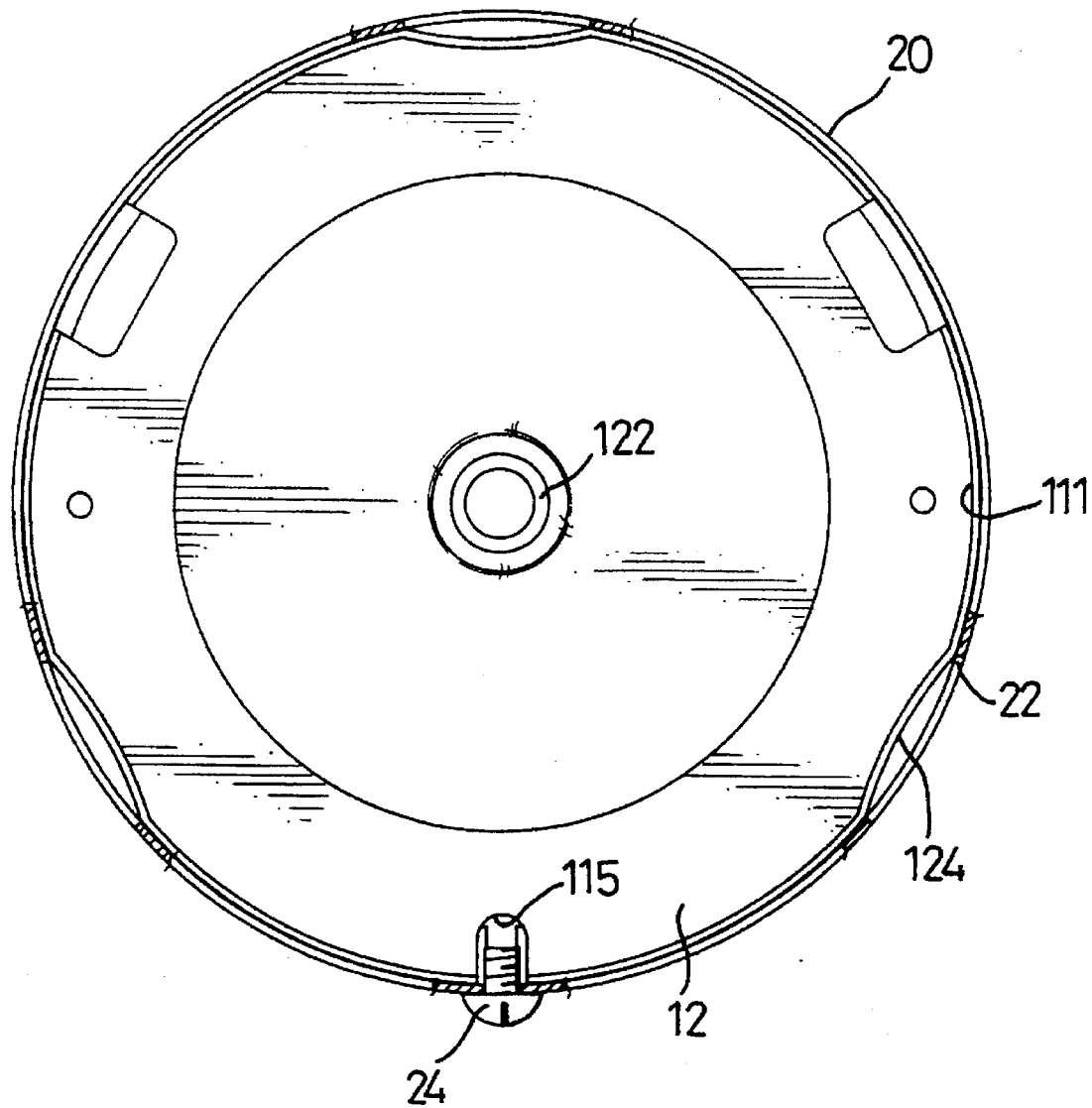
FIG. 5 is a top plane view, partly in section, of the engagement of the body and the casing.

Referring to the drawings and initially to FIGS. 3 and 4, a remote control receiver box assembly in accordance with the present invention generally includes a body 10 in which a plurality of electrical devices are disposed, a casing 20 which receives the body 10 therein and a lid 30 which is mounted onto the casing 20. The body 10 comprises an upper cap 11 and a lower cap 12, the upper cap 11 having a top portion which comprises a flange 110 and a hole defined by the flange 110 and a first peripheral wall 111 extending from a periphery of the flange 110 and three first concave portions 112 longitudinally defined in an outer periphery of the first peripheral wall 111, the lower cap 12 having a bottom 120 from which a tube 122 extends toward the upper cap 11 and the tube 122 has a hole 123 defined therethrough for wires (not shown) to extend therethrough. The upper cap 11 has three recesses 115 defined longitudinally in the outer periphery of the first peripheral wall 11 thereof. The bottom 120 has a second peripheral wall 121 extending from a periphery of the bottom 120 and toward the upper cap 11, the second peripheral wall 121 having three second concave portions 124 longitudinally defined in an outer periphery thereof and each of the second concave portions 124 being in alignment with the first concave portion 112 of the upper cap 11 corresponding thereto. The first and the second concave portions 112, 124 are made of transparent material.

The upper cap 11 has two first pillars 113 extending from the flange 110 and toward the lower cap 12, each of the first pillars 113 having a threaded recess 1131 defined in a distal end thereof, the lower cap 12 having two second pillars 125 extending from the bottom 120 thereof and toward the upper cap 11, each of the second pillars 125 having a hole 1251 defined therethrough, the first and the second pillars 113, 125 being in alignment with each other for a bolt 126 threadedly connected therethrough when the upper cap 11 mounted to the lower cap 12. The upper cap 11 has a rib 114 extending longitudinally from an inner periphery of the first peripheral wall 111 and the lower cap 12 has two protrusions 127 extending longitudinally from an inner periphery of the second peripheral wall 121 thereof, the two protrusions 127 defining a slot 1271 therebetween for the rib 114 being inserted in the slot 1271.

The casing 20 has a side wall 21 and has an open top for the body 10 being inserted therethrough, the side wall 21 having three openings 22 defined in a periphery thereof such that the first and the second concave portions 112, 124 of the body 10 can be seen from the corresponding opening 22 of the casing 20 when the body 10 is fitted into the casing 20.

The lid 30 has a top 31 and a third peripheral wall 32 extending from the top 31 of the lid 30, the third peripheral wall 32 having three holes 33 defined therein, the casing 20 having three holes 23 defined in the side wall corresponding to the holes 33 of the lid 30. The lid 30 is mounted to the casing 20 such that a bolt 24 extends through the corresponding hole 23 of the casing 20, the hole 33 of the lid 30 and engages with the recess 115 of the upper cap 11 so as to assure that the upper cap 11 will not rotate corresponding to the lower cap 12.

Accordingly, the first and the second concave recesses 112, 124 of the body 10 of the present invention will not be scratched or scraped when inserted into the casing 20, and the engagement between the body 10, the casing 20 and the lid 30 assures that the body 10 will not rotate with respective to the casing 20 such that the size of the body 10 can be allowed to have a large fitting clearance corresponding to the size of the casing 20.

Although the invention has been explained in relation to its preferred embodiment, it is to be understood that many other possible modifications and variations can be made without departing from the spirit and scope of the invention as hereinafter claimed.

What is claimed is:

1. A remote control receiver box assembly comprising:

a body, said body comprising an upper cap and a lower cap, said upper cap having a top portion including a flange and a hole defined by said flange and a first peripheral wall extending from a periphery of said flange and toward said lower cap, at least one first concave portion defined in an outer periphery of said first peripheral wall, said lower cap having a bottom in which a hole is defined, said bottom having a second peripheral wall extending from a periphery of said bottom and toward said upper cap, said second peripheral wall having at least one second concave portion defined in an outer periphery thereof and said second concave portion being in alignment with said first concave portion of said upper cap, said first and said second concave portions being made of transparent material; and a casing, said casing having a side wall and having an open top for said body being inserted therethrough and having at least one opening defined in a periphery thereof such that said first and said second concave portions of said body can be seen through said corresponding opening of said casing when said body is fitted into said casing.

2. The box assembly as claimed in claim 1 wherein said upper cap has at least one first pillar extending from said top and toward said lower cap, said first pillar having a threaded recess defined in a distal end thereof, said lower cap having a hole defined in a bottom thereof and at least one second pillar extending from said bottom thereof and toward said upper cap, said second pillar having a hole defined therethrough, said first and said second pillars being in alignment with each other for a bolt threadedly connected therethrough when said upper cap is mounted to said lower cap.

3. The box assembly as claimed in claim 1 wherein said upper cap has a rib extending longitudinally from an inner periphery of said first peripheral wall and said lower cap has two protrusions extending longitudinally from an inner periphery of said second peripheral wall thereof, said two protrusions defining a slot therebetween for said rib being inserted in said slot.

4. The box assembly as claimed in claim 1 further comprising a lid having a top and a third peripheral wall extending from said top of said lid, said third peripheral wall having a hole defined therein, said casing having a hole defined in said side wall, said lid mounted to said casing and said upper cap having a recess defined longitudinally in said outer periphery of said first peripheral wall thereof such that a bolt extending through said hole of said casing, said hole of said third peripheral wall of said lid, and engaged with said recess of said upper cap.

* * * * *